UNITED STATES PATENT OFFICE.

WILLIAM MORRISON, OF DES MOINES, IOWA.

NEGATIVE-POLE PLATE FOR STORAGE BATTERIES.

1,067,437. Specification of Letters Patent. Patented July 15, 1913.

No Drawing. Application filed September 7, 1912. Serial No. 719,197.

*To all whom it may concern:*

Be it known that I, WILLIAM MORRISON, a citizen of the United States, residing at Des Moines, in the county of Polk and State of Iowa, have invented certain new and useful Improvements in Negative-Pole Plates for Storage Batteries, of which the following is a specification.

This invention relates to the production of an improved negative pole plate for storage batteries, in which the plate will have a longer life and a higher efficiency than has been obtained heretofore.

The object of my invention is to produce a negative pole plate in which the active material is in very perfect contact with the grid, reducing the liability of its separating and falling off from the grid, or losing its electrical contact by the shrinking that takes place during the life of the plate.

In carrying out the process, a mixture of litharge and red lead is made into a paste with sulfuric acid and pressed into a lead-antimony grid in the well-known manner for making battery plates. The plate is now subjected to the customary "oxidizing or forming" action by connecting it as an anode in an electrolyte of dilute sulfuric acid, the strength of which is varied with the thickness and the density of the plate. After being fully charged and "formed," a small quantity of an acid in which lead is soluble, or a salt containing such an acid radical, is added to the sulfuric acid, and the charging process continued until a portion of the lead of the grid has been dissolved, the current assisting in carrying the solvent acid into the pores of the active material and in contact with the grid, thereby dissolving lead from the grid by the solvent acid electrochemically and forming a soluble lead compound. As the soluble lead compound forms, it permeates to a greater or less extent the pasted active material adjacent the grid, and reacts with the sulfuric acid present, forming lead sulfate, which in turn is electrolytically oxidized, thoroughly cementing the pasted active material with the grid. A part of the solvent acid liberated from the soluble lead compound by sulfuric acid dissolves more lead from the grid, forming more lead sulfate, which in its turn is oxidized, binding the active material and the grid still more firmly.

The sulfate is preferably oxidized by the current to lead peroxid, forming a peroxid binder between the grid and the pasted active material, the binder extending to a greater or less depth in the mass of the active material, and thoroughly enmeshing the particles of the latter.

Should the electrolyte contain too much solvent acid, the electrode after sufficient lead sulfate has been formed, should be transferred to a separate electrolyte in which the lead sulfate is preferably oxidized electrolytically to peroxid, or it may be reduced to metallic spongy lead direct electrolytically, and the solvent acid remaining in the plate is substantially entirely decomposed by the electrolysis. I prefer, however, to add substantially the right quantity of solvent acid to the electrolyte in the first instance, in order that the decomposition of the solvent acid will terminate when a sufficient qauntity of lead sulfate has been formed, so as to continue the oxidation in the same acid. It is preferable that the charging process continue until all the sulfate has been oxidized to peroxid, and that no sulfate remain in contact with the grid.

While I prefer to use the method above described, I may add the solvent acid in the beginning, and proceed with the oxidation of the pasted active material and the formation of lead sulfate binder from the grid simultaneously. Another method of procedure is to immerse the plate, either before or after the oxidation of the pasted active material, in the solvent acid separately, until enough has been absorbed to dissolve a sufficient quantity of lead from the grid, and then immerse the saturated grid in the sulfuric acid electrolyte and complete the process. Still another method is to immerse the pasted plate either before or after the preliminary oxidation of the pasted active material, in a solution of the solvent acid or salt containing the acid radical of the solvent acid until a sufficient quantity of the solvent acid or its equivalent has been absorbed by the plate, then removing and immersing the plate in sulfuric acid to precipitate the dissolved lead as lead sulfate, then electrochemically oxidizing the lead sulfate to lead peroxid to form the binding agent.

I have stated that I use an acid in which lead is soluble for the corrosion of the grid; for practical reasons I prefer to use nitric acid as the solvent acid.

At the completion of the above processes, the plate is suitably reduced to metallic spongy lead as a cathode in an electrolyte of sulfuric acid, the electrolysis preferably being carried to excess to decompose all traces of solvent acid. The plate may now be placed in a storage battery as a negative pole plate.

I claim:

1. A negative-pole plate for storage batteries, comprising a grid, a coating of pasted active material thereon, and a bond of active material electrochemically formed *in situ* from the grid interpenetrating and uniting said pasted active material and the grid.

2. The process of forming negative-pole plates for storage batteries, which comprises adding to a pasted plate a reagent capable of dissolving matter from the grid, dissolving matter from said grid, precipitating said dissolved matter, thereby forming between the grid and the active material a binding agent, which binds the active material to the grid, and passing a current through an electrolyte with said plate as an electrode.

3. The process of forming negative-pole plates for storage batteries, which comprises adding to a pasted plate a reagent capable of dissolving and precipitating matter from the grid, dissolving and precipitating matter from said grid, thereby forming between the grid and the active material a binding agent which binds the active material to the grid, and passing a current through an electrolyte with said plate as an electrode.

4. The process of forming negative-pole plates for storage batteries, which comprises adding a reagent to a pasted plate capable of dissolving matter from the grid, electrochemically dissolving matter from said grid, precipitating said dissolved matter, electrochemically oxidizing said precipitate, thereby forming between the grid and the active material a binder which binds the active material to the grid, and reducing said plate to form a negative-pole plate.

5. The process of forming negative-pole plates for storage batteries, comprising the steps of applying material to become active to a grid, electrochemically forming the plate in an electrolyte, dissolving matter from the grid electrochemically, and then forming a binding agent from said dissolved matter.

6. The process of forming negative-pole plates for storage batteries, comprising the steps of impregnating a pasted plate with a solvent for matter of the grid, passing a current through an electrolyte from the grid as an anode, thereby dissolving and oxidizing matter from the grid, said dissolved and oxidized matter binding the active material to the grid.

7. The process of forming negative-pole plates for storage batteries, comprising the steps of dissolving lead from the grid, precipitating the dissolved lead while in contact with the grid as lead-binding-agent, oxidizing the lead-binding-agent *in situ*, and then reducing the plate to a spongy lead negative pole plate.

8. The process of forming negative-pole plates for storage batteries, comprising the steps of pasting material to become active on a grid thereby forming a plate, oxidizing the material to become active, immersing the oxidized plate in an electrolyte containing a solvent for material of the grid, and forming between the grid and the active material a bonding agent from the matter dissolved from said grid.

9. The process of forming negative-pole plates for storage batteries, comprising impregnating a pasted plate with a solvent for matter in the grid, passing a current through an electrolyte from the grid as anode, thereby dissolving and oxidizing matter from the grid, said dissolved and oxidized matter binding the active material to the grid, and reducing the active material and binding matter to form the negative-pole plate.

10. The process of forming negative-pole plates for storage batteries, comprising impregnating a pasted active material plate with a reagent containing nitric acid, passing a current through an electrolyte from the grid as an anode, thereby dissolving matter from the grid, precipitating the dissolved matter within the pores of the pasted plate thereby forming between the grid and the active material a binding agent, oxidizing the binding agent, and reducing the active material and binding agent to form a negative-pole plate.

In testimony whereof I affix my signature in presence of two witnesses.

WILLIAM MORRISON.

Witnesses:
C. W. Fowler,
J. H. Brickenstein.